United States Patent [19]

Croisier

[11] Patent Number: 4,601,030
[45] Date of Patent: Jul. 15, 1986

[54] MULTIPOINT SYSTEM FOR INTERCONNECTING WORK STATIONS

[75] Inventor: Alain Croisier, Cagnes sur Mer, France

[73] Assignee: International Business Machines Corp., Armonk, N.Y.

[21] Appl. No.: 560,634

[22] Filed: Dec. 12, 1983

[30] Foreign Application Priority Data

Dec. 28, 1982 [EP] European Pat. Off. ........ 82430048.7

[51] Int. Cl.$^4$ ............................................. H04J 3/00
[52] U.S. Cl. .................................... 370/88; 340/825.5
[58] Field of Search ..................... 370/85, 86, 88, 31, 370/96; 340/825.5

[56] References Cited

U.S. PATENT DOCUMENTS

| | | | |
|---|---|---|---|
| 3,924,077 | 12/1975 | Blakeslee | 370/85 |
| 4,140,877 | 2/1979 | Joslow et al. | 370/85 |
| 4,301,532 | 11/1981 | Janetzky | 370/85 |
| 4,340,775 | 7/1982 | Gesek et al. | 370/88 |
| 4,503,533 | 3/1985 | Tobagi et al. | 370/85 |
| 4,504,945 | 3/1985 | Kunikyo | 370/89 |

Primary Examiner—Douglas W. Olms
Assistant Examiner—Frank M. Scutch, III
Attorney, Agent, or Firm—John B. Frisone

[57] ABSTRACT

A multipoint connection system adapted to operate in the time-division multiplex mode. The system includes an output link (21), connected to the output of a control station (10) and to the input of each of the work stations (WS-1, WS-2), and a U-shaped input link (22) one leg of which has its end connected to the input of the control station and the other leg (22-2) of which is terminated by an impedance (Z2) and is connected to the output of each work station. The signals on the output link and on leg (22-2) travel in the same direction, thereby eliminating the need to provide adjustable means of determining the transmission times specific to each work station.

3 Claims, 8 Drawing Figures

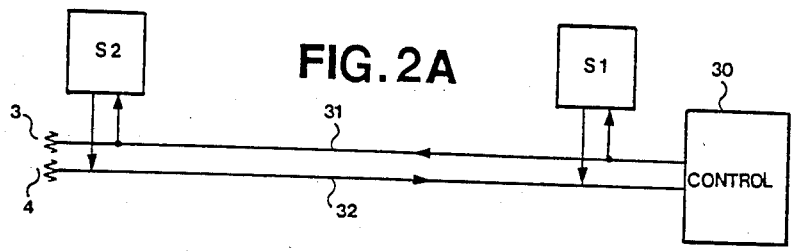
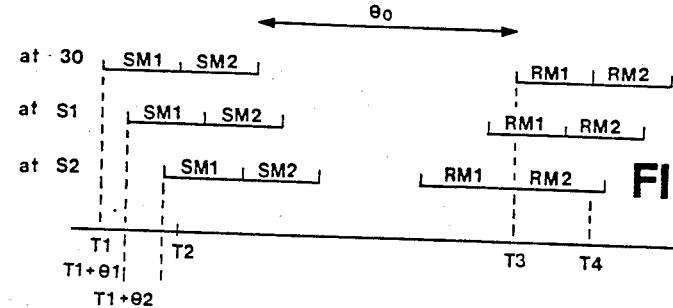
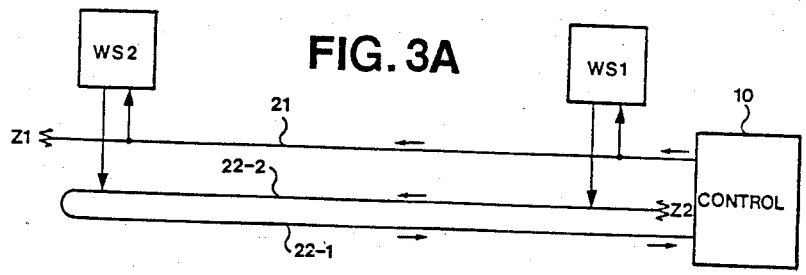
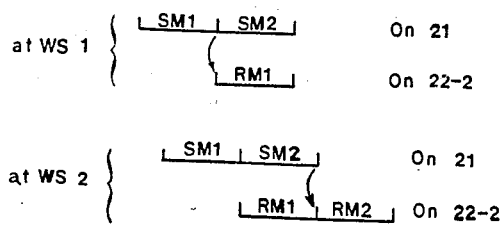

MULTIPOINT SYSTEM FOR INTERCONNECTING WORK STATIONS

BACKGROUND OF THE INVENTION

1. Field of the Invention

This invention relates to multipoint systems for interconnecting work stations and, more particularly, to a multipoint connection system capable of operating in the time-division multiplex mode.

2. Prior Art

In-plant communication systems generally require that each of the work stations associated with the system be capable of handling voice, text, image and data processing applications and that all work stations be coupled to a central switching and data processing unit. Because the coupling of the central unit to the communication links accounts for a substantial portion of the overall cost of the system, it is desirable that a given line be shared by several work stations. For the purposes of voice (i.e. telephone) applications, each station requires an independent channel which can be economically provided through the use of the time-division multiplexing technique. For other applications, the stations can be made to share a common channel by means of a particular access protocol.

Loop connection systems have two main advantages, namely, their compatibility with the time-division multiplexing technique and the efficiency of the access protocols. However, such systems are somewhat deficient in the areas of reliability and availability. Multipoint connection systems, on the other hand, are reliable and make it easy to couple an additional station to the system without having to interrupt the operation of the other stations, but are particularly unsuited to operation in the time-division multiplex mode, as will be shown in detail hereafter with reference to FIGS. 2A and 2B.

SUMMARY OF THE INVENTION

It is the object of this invention to provide a multipoint system for interconnecting work stations that lends itself particularly well to operation in the time-division multiplex mode.

Generally, the invention proposes a system for connecting a first station to a plurality of second stations, comprising a first link the ends of which are respectively connected to the output of the first station and to a terminating impedance, and to which the input of each of said second stations is connected, and a second link the ends of which are respectively connected to the input of the first station and to a second terminating impedance, and to which the output of each of said second stations is connected, said second link being arranged such that the portion thereof that lies between the nearest and the farthest of said second stations relative to the first station has substantially the same length as the portion of said first link that lies between said nearest and farthest of said second stations and that signals travel in the same direction on said portions of said first and second links.

In accordance with one aspect of the invention, said second link is configured as a U the first leg of which has its end connected to the input of the first station and the other leg of which has its end connected to said second terminating impedance, with the outputs of said second stations being connected to said second leg.

The foregoing and other objects, features and advantages of the invention will be apparent from the following description of a preferred embodiment thereof, as illustrated in the accompanying drawings.

BRIEF DESCRIPTION OF THE DRAWINGS

FIG. 2A is a schematic diagram of a prior art multipoint connection system.

FIG. 2B is a timing diagram illustrating the operation of the system of FIG. 2A in the time-division multiplex mode.

FIG. 3A is a schematic diagram of the connection system of FIG. 1.

FIG. 3B is a timing diagram illustrating the operation of the system of FIG. 3A in the time-division multiplex mode.

DESCRIPTION OF THE PREFERRED EMBODIMENT

Figure 1:
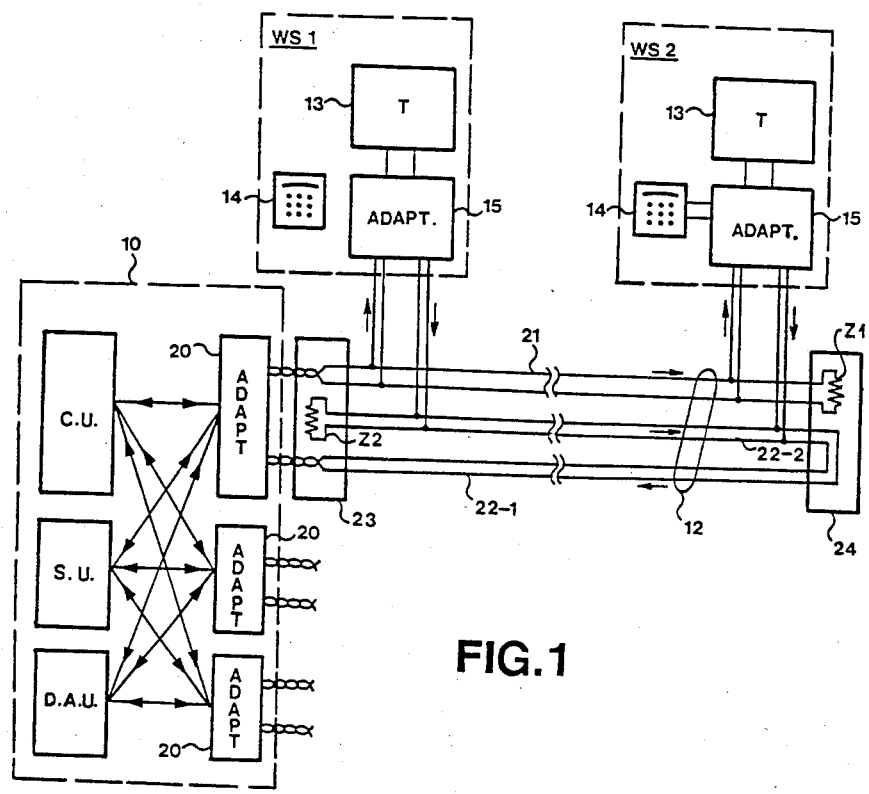
FIG. 1 shows a connection system in accordance with the invention.

Referring now to FIG. 1, a system for connecting work stations in accordance with the invention is shown. The system includes a control unit or station 10 that communicates with a plurality of work stations, two of which, WS1 and WS2, are shown, via a common communication link 12. Each work station may comprise one or more devices such as a screen terminal, a printer, a telephone set, etc. By way of example, each of the work stations WS1 and WS2 shown in FIG. 1 includes a terminal (T) 13 and a digital telephone set 14, both of which are connected to the common communication link 12 through an adapter 15. Control station 10 comprises, for example, three adapters 20 (each of which is associated with a link serving, say, four stations), one control unit (CU), one time-division switching unit (SU) and one data application unit (DAU). Common communication link 12 consists of an output line 21 and an input line 22 which may be twisted pairs of conductors, as shown, and are arranged as described hereafter. Output line 21 has one end connected to the output of control station 10 and its other end terminated by an impedance Z1, and is connected to the input of each work station WS1, WS2. Input line 22 is shaped as a U one of the legs of which, labeled 22-1, has its end connected to the input of control station 10, and the other leg of which, labeled 22-2, has its end terminated by an impedance Z2. Work stations WS1, WS2 have their outputs connected to leg 22-2 of input line 22. Terminating impedance Z1 may be housed in a connection box 23 that serves to couple common link 12 to control unit 10. Terminating impedance Z2 and the base of U-shaped input line 22 may be housed in a termination box 24 located beyond the farthest work station connected to the system. The portion of output line 21 that lies between the first and the last work stations connected to the system must have substantially the same length as the portion of leg 22-2 that lies between said first and last work stations. In FIG. 1, the signals from control station 10 travel from left to right on output line 21 and are absorbed by impedance Z1; the signals from the work stations travel from left to right on leg 22-2, from right to left on leg 22-1, and are applied to the input of control station 10.

The present system is particularly advantageous where control station 10 and work stations WS1 and WS2 are operated in the time-division multiplex mode, as will become apparent from the following description of FIGS. 2A, 3A and 3B.

Referring now to FIG. 2A, a prior art multipoint connection system is schematically shown. The system includes a control station 30 communicating with a plurality of work stations, two of which, S1 and S2, are shown, via a common link consisting of an output line 31 and an input line 32. Output line 31 connects the output of control station 30 to the input of each work station S1, S2, and is terminated by an impedance Z3. Input line 32 connects the outputs of work stations S1, S2 to the input of control station 30 and is terminated by an impedance Z4. In the time-division multiplex mode of operation, control station 30 defines on output line 31 recurrent frames of equal duration and, within each of these, a number of output time-division channels that are allocated to the work stations. Control station 30 transmits a message to a given work station over output line 31 during the output time-division channel allocated to that station. If the length of the message exceeds the capacity of one output time-division channel, then control station 30 will transmit successive portions of the message during an appropriate number of successive frames, each portion being transmitted during the output time-division channel allocated to the work station involved. Similarly, a work station transmits a message to control station 30 by placing same or a portion thereof on input line 32 during the input time-division channel allocated thereto. In general, an output time-division channel and the corresponding input time-division channel are allocated to the same work station; for example, the n$^{th}$ output time-division channel on output line 31 and the n$^{th}$ input time-division channel on input line 32 would be allocated to the same work station.

FIG. 2B illustrates the propagation of two messages, SM1 and SM2, respectively intended for work stations S1 and S2 and placed by control station 30 on output line 31 during two successive output time-division channels of the same frame. Message SM1 is transmitted by control station 30 at time T1 and reaches work station S1 at time T1+$\theta$1, where $\theta$ is the propagation time of the message between control station 30 and work station S1, and work station S2 at time T1+$\theta$2, where $\theta$ is the propagation time of the message between control station 30 and work station S2. Message SM2 is transmitted by control station 30 at time T2 and reaches work stations S1 and S2 at times T2+$\theta$1 and T2+$\theta$2, respectively. Answering messages or responses RM1 and RM2 from work stations S1 and S2, respectively, should be received by control station 30 during two successive input time-division channels, for example at times T3 and T4. The duration of the time interval between the end of the transmission of message SM1 by control station 30 and the beginning of the reception by control station 30 of answering message RM1 shall be designated $\theta$0. In order for answering message RM1 to be received by control station 30 at time T3, RM1 must be sent by work station S1 a time interval $\theta$0−2$\theta$1 after message SM1 has been received by S1. In order for answering message RM2 to be received by control station 30 at time T4, work station S2 must send RM2 a time interval $\theta$0−2$\theta$2 after receiving message SM2. Since times $\theta$1−2$\theta$1 and $\theta$0−2$\theta$2 are of course different, each work station must be provided with adjustable and accurate means of determining as a function of its actual location on the common communication link the specific time at which it can transmit. This increases the cost of the work stations and makes it necessary to adapt each work station at installation time.

For clarity, FIG. 3A is a simplified schematic diagram of the system of the invention, as illustrated in FIG. 1, and FIG. 3B is a timing diagram illustrating its operation in the time-division multiplex mode. It will be assumed that the actual locations of control station 10 and work stations WS1 and WS2 are the same as those of control station 30 and work stations S1 and S2, respectively. Control station 10 successively transmits messages SM1 and SM2 to work stations WS1 and WS2 via output line 21 at times T1 and T2, respectively. Message SM1 is received by station WS1 at time T1+$\theta$1. In accordance with the invention, station WS1 places its answering message RM1 on leg 22-2 of input line 22 a predetermined fixed time interval after receiving message SM1. This delay or response time may start at the beginning, the end or any other part of message SM1 and have any predetermined duration. In FIG. 3B, by way of example, station WS1 transmits its answering message RM1 immediately after receiving message SM1. Messages SM1 and SM2 on output line 21 and message RM1 on leg 22-2 travel simultaneously and in the same direction toward work station WS2. At time T2+$\theta$2, message SM2 is received by work station WS2, which places its answering message RM2 on leg 22-2, wing the same response time as work stations WS1. Thus, answering messages RM1 and RM2 are automatically sent during appropriate input time-division channels and are applied to the input of control station 10.

It will be readily apparent that the system of the present invention does not require that the work stations be provided with adjustable means of determining the respective times at which they can transmit and that they be suitably adapted at installation time.

Figure 4:
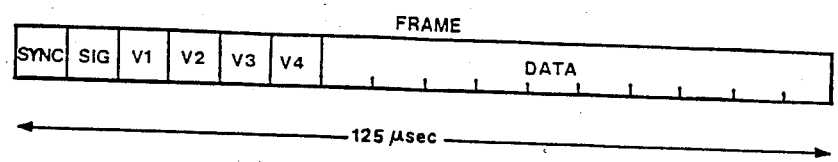
FIG. 4 shows the format of a frame on output line 21 of FIG. 1.

An exemplary embodiment of adapters 15 and 20, as used in a connection system in accordance with the invention and wherein they operate in the time-division multiplex mode, will now be described. Control station 10 transmits a train of bits that is divided into output frames of sixteen 8-bit bytes each. The duration of each frame is 125 microseconds, and the bit rate for the train of bits is 1.024 Mbps. As shown in FIG. 4, each output frame has the following format:

Byte 0: synchronization pattern
Byte 1: signaling channel
Bytes 2-5: four time-division voice channels
Bytes 6-15: these bytes make up one time-division data channel.

The continuous train of bits received by control station 10 is divided into input frames of sixteen 8-bit bytes each having the following format, which is similar to that of the output frames:

Byte 0: not used
Byte 1: input signaling channel
2-5: four time-division voice channels
Bytes 6-15: time-division data channel.

The synchronization pattern may be conventionally comprised of a sequence of predetermined bits easily recognizable by the work stations. The signaling channel enables the control station to exchange predefined signaling messages with the work stations, and in particular to establish a telephone connection with a work station and allocate the four time-division voice channels to selected work stations. A typical signaling message comprises:

a signal code that specifies the type of signaling message involved, that is, whether it relates to such conditions as "on-hook", "off-hook", "busy", "available", to the allocation of time-division voice channels, to an interruption request, etc . . .

the address of the work station concerned, and an end-of-message code.

The time-division voice channels can carry a digitalized voice sample.

The time-division data channel is common to all work stations. Several frames are logically processed as one continuous train of bits. The exchange of data is performed under the control of a suitable protocol such as the one known as HDLC-NRM.

Figure 5:
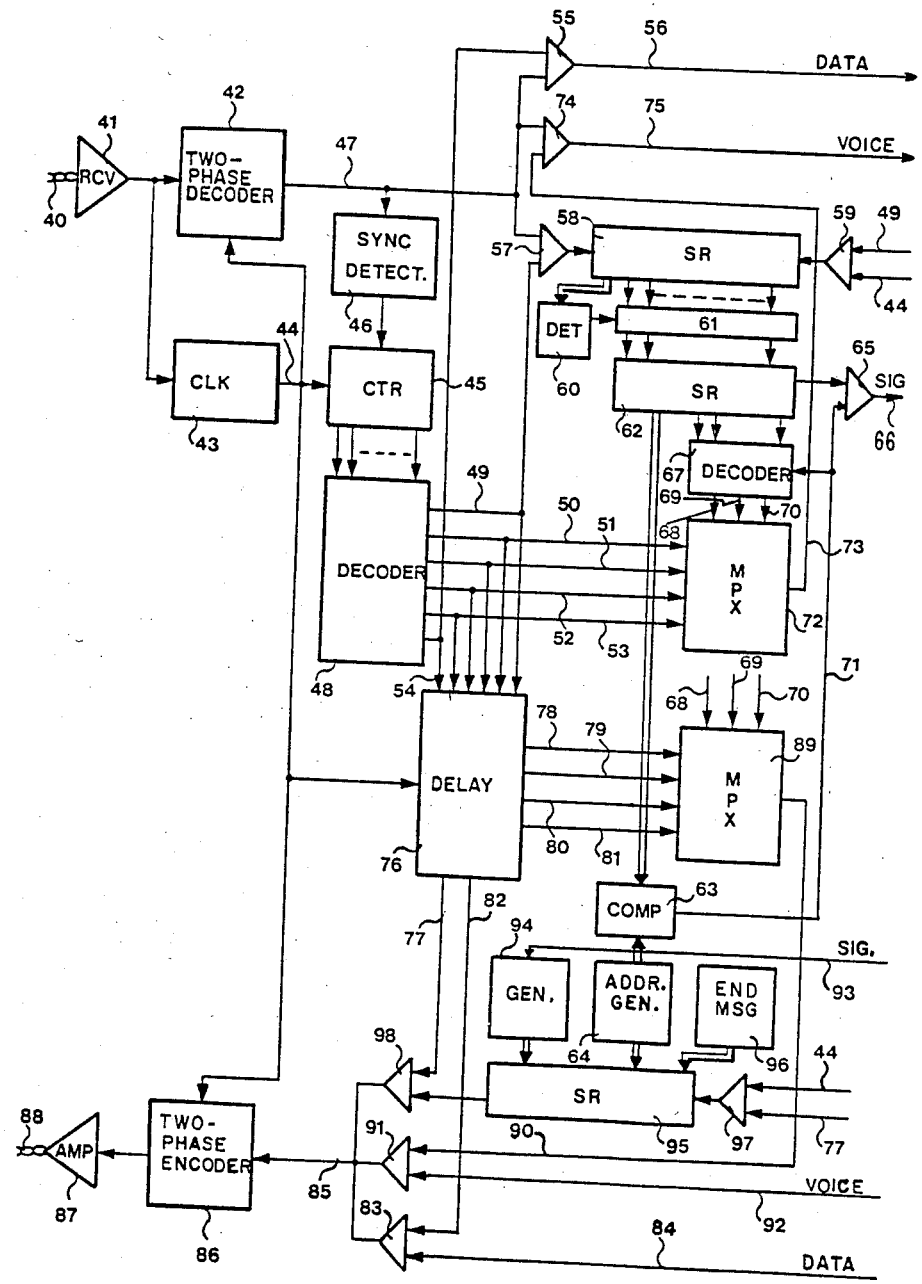
FIG. 5 shows an embodiment of adapter 15 of FIG. 1.

Referring now to FIG. 5, there is shown an exemplary embodiment of a work station adapter 15 operating in the time-division multiplex mode using the frames described above. The signal present on output line 21 (FIG. 1) is supplied via a line 40 to a high input impedance receiver 41 the output of which is applied to a two-phase decoder 42. The output from receiver 41 is also applied to a clock recovery device 43 which derives therefrom in a known manner a clock signal that is generated at the bit rate on line 44. This clock signal is supplied to two-phase decoder 42, and to the input of a counter 45 which is reset to zero by the output from a synchronization pattern detector 46 which has its input connected to a line 47, itself connected to the output of two-phase decoder 42. Counter 45 is connected to a decoder 48 which has six outputs respectively connected to six lines, 49-54, on which it respectively provides a signal designated SIG, which is high during the signaling channel, that is, during the time interval when the counter counts the first eight bit times that occur after it has been reset to zero, four signals designated V1-V4, which are respectively high during the four time-division voice channels, and a signal designated DATA, which is high during the time-division data channel. The DATA signal on line 54 and the signal present on line 47 are applied as inputs to an AND gate 55 the output from which is supplied to terminal 13 (FIG. 1) via a data output line 56. The SIG signal on line 49 and the signal on line 47 are applied as inputs to an AND gate 57 the output from which is applied to the input of a shift register 58 comprising a number of stages equivalent to the number of bits in a signaling message and the contents of which are shifted under control of the output from an AND gate 59. Gate 59 receives as inputs the SIG signal on line 49 and the clock signal on line 44. The first n stages of shift register 58, where n is the number of bits in the end-of-message code, are connected to a detector circuit 60. The output from circuit 60 controls a transfer gate 61 connecting those stages of shift register 58 which, when the register contains a signaling message, correspond to the signal code and to the address, to a signaling message shift register 62. Those stages of shift register 62 which contain the address provided in the signaling message are connected to the input of a comparator 63, the other input of which receives the work station address supplied by an address generator 64. The outputs from shift register 62 and comparator 63 are applied as inputs to an AND gate 65, the output from which is applied to digital telephone set 14 (FIG. 1) via a signaling line 66. The stages of shift register 62 that contain the signal code for the signaling message are connected to a decoder 67, which has three outputs respectively connected to lines 68-70 and an inhibit input connected to the output of comparator 63 via a line 71. Lines 50-53 and 68-70 are connected to a multiplexer 72 the output from which is applied as one input via a line 73 to an AND gate 74 which has its other input connected to line 47. The output from AND gate 74 is applied to telephone set 14 via a voice output line 75.

Lines 49-53 are connected to a delay circuit 76 which is controlled by the clock signal on line 44 and provides on six lines, 77-82, signals respectively designated DEL SIG, DEL V1, DEL V2, DEL V3, DEL V4, and DEL DATA, which are delayed versions of the SIG, V1-V4 and DATA signals. The DEL DATA signal on line 82 is applied to an AND gate 83 which also receives the contents of data output line 84 from terminal 13. The output from AND gate 83 is applied via line 85 to a two-phase encoder 86 which also receives the clock signal on line 44. The output from encoder 86 is applied to a high output impedance amplifier 87 which has its output connected to input line 22 by a line 88. Lines 78-81 and 68-70 are connected to a multiplexer 89 the output from which is applied via a line 90 to one input of an AND gate 91 the other input of which is connected to telephone set 14 via a voice input line 92. A signaling message input line 93 is connected to a signal code generator 94, the output from which is connected to a shift register 95, which also receives the output from address generator 64 and that from an end-of-message code generator 96. The contents of shift register 95 are shifted under control of the output from an AND gate 97 which receives as inputs the DEL SIG signal on line 77 and the timing signal on line 44. The output from shift register 95 and the signal present on line 77 are applied as inputs to an AND gate 98 the output of which is connected to line 85.

In operation, the signal on output line 21 is supplied through receiver 41 to two-phase decoder 42 which provides on line 47 the train of bits from control station 10. Upon detecting a synchronizaton pattern within said train of bits, detector 46 resets to zero counter 45, which starts counting the successive bit times defined by the clock signal on line 44, and decoder 48 successively raises the SIG, V1-V4 and DATA signals on lines 49-54. When the SIG signal goes high, AND gate 57 is activated and the byte within the signaling channel is loaded into shift register 58. This loading process is repeated at each frame. Upon detecting an end-of-message code in the leftmost stages of shift register 58, detector 60 causes gate 61 to transfer the contents of shift register 58 to shift register 62. The address contained in the signaling message is compared with that of the work station, as provided by generator 64. If the two addresses do not match, the output from comparator 63 goes low and inhibits AND gate 65 and decoder 67. If both addresses match, the output from comparator 63 goes high, thereby activating decoder 67. If the signal code specifies an operation other than the allocation of a time-division channel, decoder 67 inhibits multiplexer 72 via line 70 and the signaling message is shifted out and transferred to telephone set 14 via output line 66. If the signal code specifies the allocation of a time-division channel, decoder 67 selects multiplexer 72 via line 70 and provides same via lines 68 and 69 with the identification of the particular one of the frame's four time-division voice channels that was allocated to the station. For example, if the second time-division voice channel is allocated to the work station, multiplexer 72 connects line 51 to line 73 and when signal V2 on line 51 goes high, line 47 will be connected to voice signal output line 75 by AND gate 74 and voice signal sample in that time-division channel will be applied to telephone set 14.

While the DATA signal on line 54 is high, AND gate 55 is activated and the train of data bits on line 47 is transferred to terminal 13 via data output line 56.

The response time alluded to earlier is provided by delay circuit 76. For simplicity, this response time is expressed herein in terms of bit times as defined by the clock signal on line 44. The signaling message sent by the work station to control station 10 is assembled in shift register 95. The end-of-message code is supplied by generator 96 and the work station's address is provided by address generator 64. The signal code is generated by generator 94 in response to the signaling pulses from telephone set 14 or to the interruption signal from terminal 15. The message assembled in the shift register is sent to the control station byte by byte whenever the DEL SIG signal is high, that is, during the input frame signaling channel. Whenever telephone set 14 is being used, voice signal samples from the set are sent over line 85 through AND gate 91, which is activated by the particular one of the DEL V1 to DEL V4 signals which was selected by multiplexer 89 in response to the signaling message received by the work station concerning the allocation of a time-division voice channel. The data bits on line 84 from terminal 13 are applied to line 85 through AND gate 83 which is activated while the DEL DATA signal is high. The train of bits on line 85 is encoded by two-phase coder 86 and applied to leg 22-2 of input line 22 (FIG. 1) via amplifier 87 and line 88.

Figure 6:
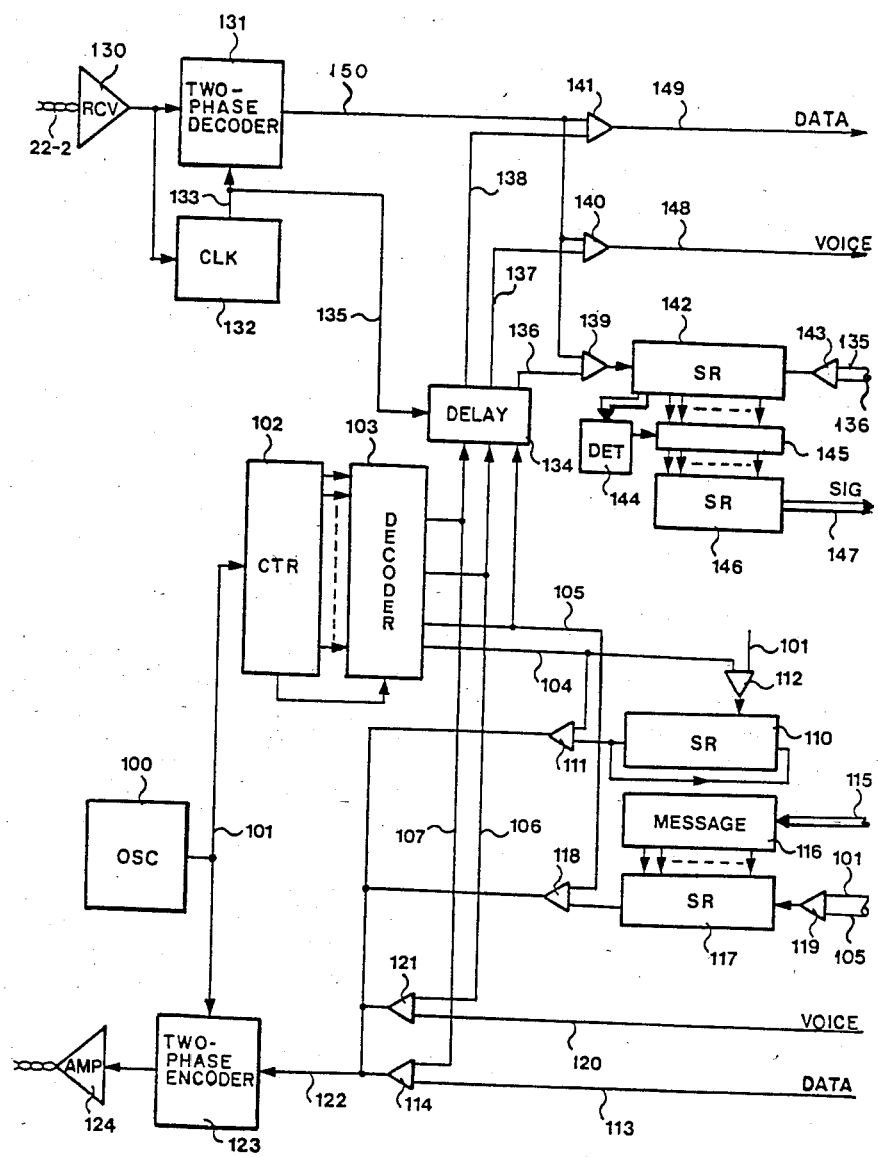
FIG. 6 shows an embodiment of adapter 20 of FIG. 1.

Referring now to FIG. 6, an exemplary embodiment of adapter 20 of control station 10 is shown. This embodimment is directly derived from that of work station adapter 15 of FIG. 5. A clock 100 supplies a 1.024 MHz clock signal that is fed at the bit rate via a line 101 to a counter 102 the stages and the carry output of which are connected to a decoder 103 similar to decoder 48 of FIG. 5. Decoder 103 has four outputs respectively connected to four lines 104–107 on which it respectively provides a SYNC-0 signal, which is high during the first eight bit times that follow the occurence of the carry signal from counter 102, a SIG-0 signal which is high during the signaling channel, and a DATA-0 signal which is high during the time-division data channel. A shift register 110, in which the synchronization pattern is stored, has its output fed back to its input and applied as one input to an AND gate 111, which receives the SYNC-0 signal on line 104 as its other input. The contents of register 110 are shifted therethrough under control of the output from an AND gate 112, which receives as inputs the clock signal on line 101 and the SYNC-0 signal on line 104. A data input line 113 from data application unit DAU and line 107 are connected to the inputs of an AND gate 114. The signaling pulses from control unit CU are supplied via a signaling input bus 115 to a signaling message generating device 116, which decodes the signals present on bus 115 and generates the signaling message. The signaling message is subsequently loaded into a shift register 117. The output from register 117 and the signal on line 105 are supplied to an AND gate 118. The contents of register 117 are shifted under control of the output from an AND gate 119, which receives as inputs the clock signal on line 101 and the SIG-0 signal on line 105. A voice output line 120 from time-division switching unit SU and line 106 are connected as inputs to an AND gate 121. The outputs of AND gates 111, 114, 118 and 121 are connected together and to a line 122, itself connected to the input of a two-phase encoder 123, which receives as its other input the clock signal on line 101. The output from two-phase encoder 123 is applied to an amplifier 124 which has its output connected to output line 21 (FIG. 1). Leg 22-1 of input line 22 is connected to a matched input impedance receiver 130 the output from which is applied to a two-phase decoder 131 and to a clock recovery device 132 that derives from the input signal a clock signal that is generated at the bit rate on a line 133 and applied to two-phase decoder 131. Lines 105–107 are connected to a delay circuit 134 which produces delayed versions, designated DEL SIG-0, DEL V-0 and DEL DATA-0, of the SIG-0, V-0 and DATA-0 signals produced by decoder 103. Delay circuit 134 introduces a delay equal to the aggregate of the response times of the work stations and the propagation times of the signals on input line 22. This delay is synchronized with the clock signal provided by device 132, and received by delay circuit 134 via a line 135. The DEL SIG-0, DEL V-0 and DEL DATA-0 signals are respectively supplied as one input to three AND gates 139–141 via lines 136–138. The other inputs of these AND gates are connected together as well as to a line 150, which is connected to the output of two-phase decoder 131. The output from AND gate 139 is applied as an input to a shift register 142 which stores a synchronization message and is similar to shift register 58 of FIG. 5. The contents of register 132 are shifted under control of the output from an AND gate 143 which receives as inputs the DEL SIG-0 signal on line 136 and the clock signal on line 135. The first n stages of shift register 142 are connected to a detector 144. The output from detector 144 controls a transfer gate 145 which couples the other stages of shift register 142 to a signaling message decoder 146. Decoder 146 is the reciprocal of signaling message generating device 116 and the output therefrom is applied via a signaling output bus 147 to control unit CU. The output from AND gate 140 is supplied to time-division switching unit SU via a voice input line 148. The output from AND gate 141 is supplied to data application unit DAU via a data input line 149.

In operation, when a carry signal is produced by counter 102, the SYNC-0 signal goes high and remains high for a time interval corresponding to an 8-bit byte, during which the synchronization pattern stored in shift register 110 is placed on line 122 through AND gate 111. When the SYNC-0 signal goes low, the SIG-0 signal goes high and remains high for a time interval corresponding to an 8-bit byte, during which the first byte of the signaling message generated by device 116 and stored in shift register 117 is placed on line 122 through AND gate 118.

Next, the four voice samples provided by time-division switching unit SU 20 are successively placed on line 129 while the V-0 signal is high. Lastly, the DATA-0 signal goes high and remains high for a time interval equivalent to ten 8-bit bytes, and ten data bytes from data application unit DAU are placed on line 122 through AND gate 114. The train of bits on line 122 is converted by two-phase encoder 123 to a two-phase signal which is sent over output line 21 through amplifier 124.

The signal received from leg 22-2 of input line 22 is applied to receiver 130, then to two-phase decoder 131 which converts same to a train of bits and supplies then on line 150. When the DEL SIG-0 signal goes high, and while it remains high, the 8-bit byte on line 150, which is the contents of the signaling channel, is loaded into shift register 142. This loading operation is repeated at every frame. When detector 144 detects an end-of-message code, the contents of shift register 142, minus that code, are loaded into device 146 through gate 145. Device 146 decodes the contents of the signaling message and supplies control unit CU with appropriate signaling pulses. When the DEL V-0 signal goes high, the voice samples in the four time-division voice channels are supplied to time-division switching unit SU through AND gate 140. When the DEL DATA-0 signal goes high, the contents of the time-division data channel are applied to data application unit DAU via AND gate 141 and line 149.

Having thus described our invention, what we claim as new, and desire to secure by Letters Patent is:

1. A communication system comprising:
    a control station having a transmit output and a receive input;
    a plurality of work stations distributed over a geographic area, each of which work stations is provided with a receive input and a transmit output;
    first unidirectional electric signal transmission media connecting the control station output in parallel to the input of each of the work stations for conveying signals from the control station to the work stations;
    second unidirectional electric signal transmission media connecting the control station input in parallel to the output of each of the work stations for conveying signals from the work stations to the control station;
    said work stations being connected to said first and second transmission media such that the electric signal propagation delay along the first and second media between stations is substantially the same whereby receipt of a message sent to a work station on said first transmission media controls the sending by that work station of a message on the said second transmission media without interference with messages sent by other work stations on the said second transmission media.

2. A communication system as set forth in claim 1 in which the work station inputs are connected to the first transmission media and the work station outputs are connected to the second transmission media, respectively in inverse order with respect to the physical distance along the respective transmission media from the control station.

3. A communication system as set forth in either claim 1 or claim 2 in which the first transmission media operates in a time-division multiplex mode and the second transmission media operates in a similar mode delayed by a substantially fixed amount of time determined by a delay circuit located in each of the work stations.

* * * * *